US009547939B2

(12) United States Patent
Hittel et al.

(10) Patent No.: US 9,547,939 B2
(45) Date of Patent: Jan. 17, 2017

(54) DETECTING AND VISUALIZING WIRELESS NETWORK DEVICES IN COMMUNICATION NETWORKS

(71) Applicant: Fluke Corporation, Everett, WA (US)

(72) Inventors: John P. Hittel, Scottsdale, AZ (US); Peter Q. Oakley, Langley, WA (US)

(73) Assignee: Fluke Corporation, Everett, WA (US)

( * ) Notice: Subject to any disclaimer, the term of this patent is extended or adjusted under 35 U.S.C. 154(b) by 13 days.

(21) Appl. No.: 14/334,482

(22) Filed: Jul. 17, 2014

(65) Prior Publication Data
US 2015/0029220 A1 Jan. 29, 2015

Related U.S. Application Data

(60) Provisional application No. 61/858,335, filed on Jul. 25, 2013.

(51) Int. Cl.
*G06T 19/00* (2011.01)
*H04W 4/02* (2009.01)

(52) U.S. Cl.
CPC .............. *G06T 19/006* (2013.01); *H04W 4/02* (2013.01)

(58) Field of Classification Search
CPC ...................................................... H04W 4/02
USPC ................ 345/629, 632, 633; 709/223–224; 455/67.11, 41.2; 726/22; 370/338
See application file for complete search history.

(56) References Cited

U.S. PATENT DOCUMENTS

| | | | | |
|---|---|---|---|---|
| 7,295,119 B2* | 11/2007 | Rappaport | ............ | G06F 17/509 709/223 |
| 7,668,570 B2* | 2/2010 | Watanabe | ............... | H04L 12/24 455/67.11 |
| 2009/0019152 A1* | 1/2009 | Huang | ................... | H04L 67/125 709/224 |
| 2009/0235354 A1* | 9/2009 | Gray | ................... | H04L 63/1416 709/224 |
| 2010/0087144 A1* | 4/2010 | Korenshtein | ........ | H04B 17/318 455/41.2 |
| 2011/0012775 A1* | 1/2011 | Richards | ................ | H01Q 19/30 342/146 |
| 2013/0107057 A1* | 5/2013 | Zhou | ....................... | H04N 5/225 348/169 |
| 2014/0055490 A1* | 2/2014 | Mule | ....................... | G06T 11/80 345/633 |
| 2014/0089810 A1* | 3/2014 | Chen | ...................... | G06F 1/1686 715/738 |
| 2014/0335795 A1* | 11/2014 | Wilbur | .................. | H04W 24/08 455/67.11 |
| 2015/0332505 A1* | 11/2015 | Wang | .................... | G06T 19/006 345/633 |

* cited by examiner

*Primary Examiner* — Chante Harrison
(74) *Attorney, Agent, or Firm* — Locke Lord LLP; Scott D. Wofsy; Christopher J. Capelli

(57) ABSTRACT

There is provided techniques for improved visualization of wireless devices in a communication network. The techniques include receiving, via an identification device, real-time display data, determining, via the identification device, a location of a network device and displaying, via a display of the identification device, the real-time display data and an indication of the location of the network device relative to the real-time display data.

18 Claims, 13 Drawing Sheets

DETECTING AND VISUALIZING WIRELESS NETWORK DEVICES IN COMMUNICATION NETWORKS

CROSS REFERENCE TO RELATED APPLICATIONS

This application claims priority to U.S. patent application Ser. No. 61/858,335 filed Jul. 25, 2013 which is incorporated herein by reference in its entirety.

BACKGROUND

1. Field of the Invention

The present disclosure relates to augmented reality techniques, and more particularly, to visualizing wireless network links in communication networks.

2. Description of the Related Art

Augmented reality provides a live (direct or indirect) view of physical, real-world environments whose elements are augmented by computer-generated sensory input such as sound, video, graphics, GPS data and the like. In this fashion, augmented reality enhances one's current perception of reality. For example, conventional augmented reality techniques that are used in TV include displaying visually augmented elements (e.g., a current box score, a highlighted line-of-scrimmage, etc.) in semantic context with environmental elements (e.g., real-time display of a sports game). Other examples of augmented reality include smartphone applications by which a user holds a mobile device (e.g., a smart phone, a tablet, etc.) in such a way that its resident integrated camera shows the real world environment with additional information about what is in the image (e.g., displaying houses on a street with additional computer-generated elements such as a cost of particular houses for sale). Regardless of the specific application, augmented reality in essence, provides information that augments what an operator's senses normally experience during any number of different situations and applications. However, while many conventional augmented reality techniques are considered satisfactory for their intended purpose, a need remains for improved augmented reality techniques that are particularly adapted for visualizing wireless network devices and displaying information related thereto.

SUMMARY

According to one embodiment of the present invention, techniques described herein provide for determining a location of a network device sending wireless radio frequency (RF) data (e.g., Wifi data, etc.). Particularly, an identification device provides an augmented reality display that overlays a location of the network device over a real-time image of the environment. When a user moves the identification device thereby changing the displayed real-time environment, the identification device dynamically updates overlay information to accurately detect and display any additional network devices.

In certain embodiments, the identification device determines the location of the network device by receiving wireless packet data including directional data (e.g., 802.11 data). Once the wireless packet data is received, the identification device determines the relative distance of the network device using techniques including, but not limited to: signal strength, triangulation based on signal strength, a lookup table storing locations of devices (e.g., stored GPS coordinates), triangulation based on signal strength for packets received at additional devices, and the like.

These and other features of the visualization techniques of the subject invention will become more readily apparent to those skilled in the art from the following detailed description of the preferred embodiments taken in conjunction with the drawings.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative technique receives, via an identification device, real-time display data, determines a location of a network device, and displays, via a display of the identification device, the real-time display data and an indication corresponding to the location of the network device.

Description

A communication network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Figure 1:
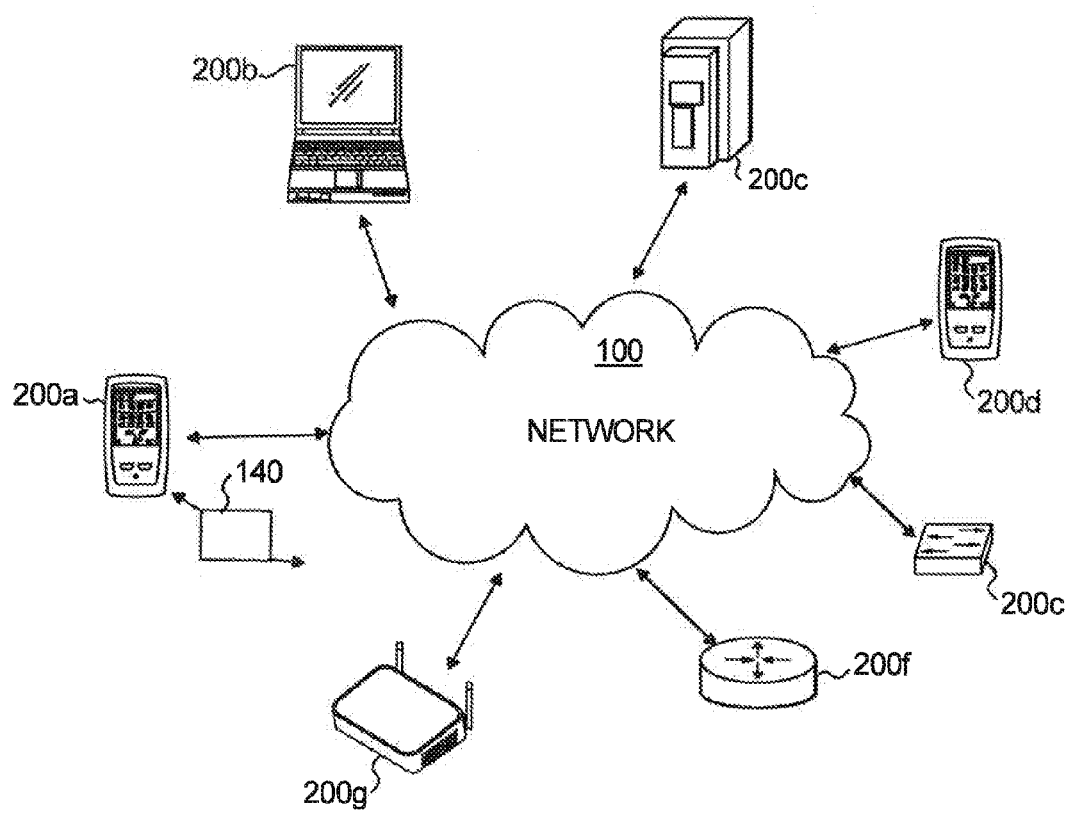
FIG. 1 illustrates an example communication network.

FIG. 1 is a schematic block diagram of an example communication network 100 illustratively comprising nodes/devices 200 (e.g., labeled as shown—"200*a*"-"200*g*"—and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the communication network, and that the view shown herein is for simplicity. Also, those skilled in the art will further understand that the network 100 is merely an example illustration that is not meant to limit the disclosure.

Data packets 140 (e.g., traffic and/or messages sent between the devices/nodes) may be exchanged among the nodes/devices of the communication network 100 using predefined network communication protocols such as the Transmission Control Protocol/Internet Protocol (TCP/IP), User Datagram Protocol (UDP), Multi-Protocol Label Switching (MPLS), wireless protocols (e.g., IEEE Std. 802.15.4, WiFi, Bluetooth®, etc.), or other shared-media protocols where appropriate. In this context, a protocol consists of a set of rules defining how the nodes interact with each other.

Figure 2:
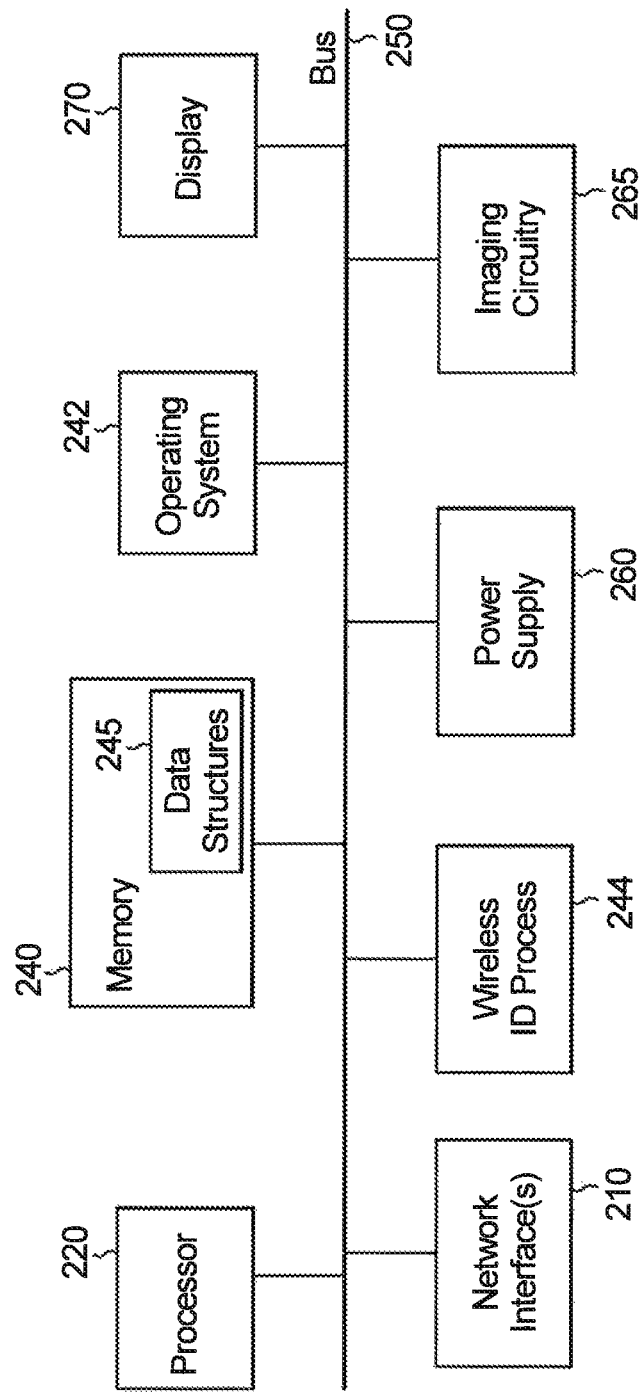
FIG. 2 illustrates an example identification device/node.

FIG. 2 is a schematic block diagram of an example node/device 200 or an identification device 200 that may be used with one or more embodiments described herein, e.g., as any of the nodes shown in FIG. 1 above. The device 200 can include, for example, known tablets, mobile phones, transparent LCD devices, and the like. As shown, the device 200 may comprise one or more network interfaces 210 (e.g., wired, wireless, etc.), at least one processor 220, and a memory 240 interconnected by a bus 250, as well as an optional power supply 260 (e.g., battery, plug-in, etc.). Further, as shown, device 200 can also optionally include resident imaging circuitry 265 (e.g., a camera) and a display 270. As is appreciated by those skilled in the art, one or more elements can be remotely located and coupled to device 200 via, for example, network 100.

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures 245 associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate one or more data structures 245 such as routes/prefixes, etc. An operating system 242, portions of which are typically resident in memory 240 and executed by the processor, functionally organizes the device by, inter alia, invoking operations in support of software processes and/or services executing on the device. These software processes and/or services may comprise a identification process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

As noted above, augmented reality provides information that augments or enhances what user normally experiences during any number of different situations and applications. For example, with respect to some recent augmented reality devices, a user can, for example, wear a pair of glasses that provides a virtual overlay and display additional data with respect to a physical environment. However, such augmented reality devices remain in its infancy and accordingly, fails to contemplate situations such as visualizing wireless network devices and displaying information related thereto.

The techniques herein provide an identification device (e.g., device 200) that detects and pinpoints a location of a wireless network device. In particular, as described herein, the techniques determine the location of the wireless network device (e.g., a radio frequency (RF) emitting device such as a Wifi device, etc.) and display real-time environmental images enhanced by data regarding the detected wireless network device (e.g., network identification data including Service set identification (SSID), Media Access Control (MAC) addresses, Internet Protocol (IP) addresses, health, bandwidth, transmission status, etc.). With respect to the location of the wireless network device, the techniques include determining a location relative to the identification device 200 via, for example, signal strength, triangulation, pre-stored location lookup, etc. Illustratively, the techniques described herein may be performed by hardware, software, and/or firmware, such as in accordance with identification process 244, which may contain computer executable instructions executed by the processor 220 to perform functions relating to the techniques described herein.

Figure 3:
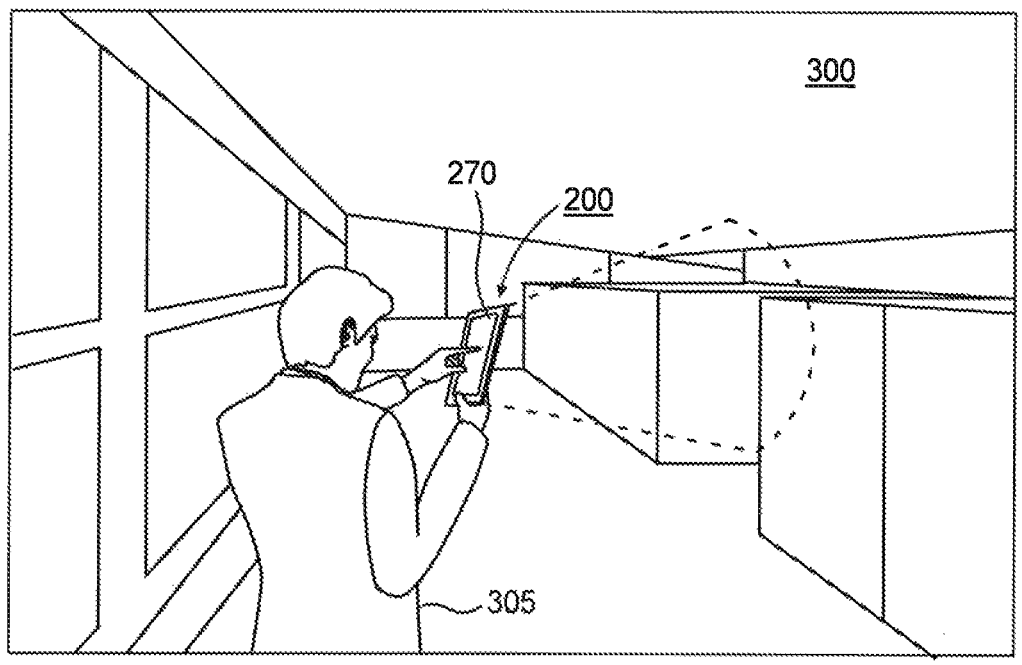
FIG. 3 illustrates an example view of the identification device shown in FIG. 2 operatively detecting and imaging a physical environment.

Referring now to FIG. 3, an example view of the identification device 200 is provided, operatively showing detection of wireless devices in a physical environment 300. As shown, a user 305 scans physical environment 300 via, for example, a camera resident in identification device 200, for additional wireless network devices. A resident display 270 provides user 305 with an image of the underlying physical environment 300 with an overlay of enhanced data regarding each detected wireless network device.

Figure 4A:
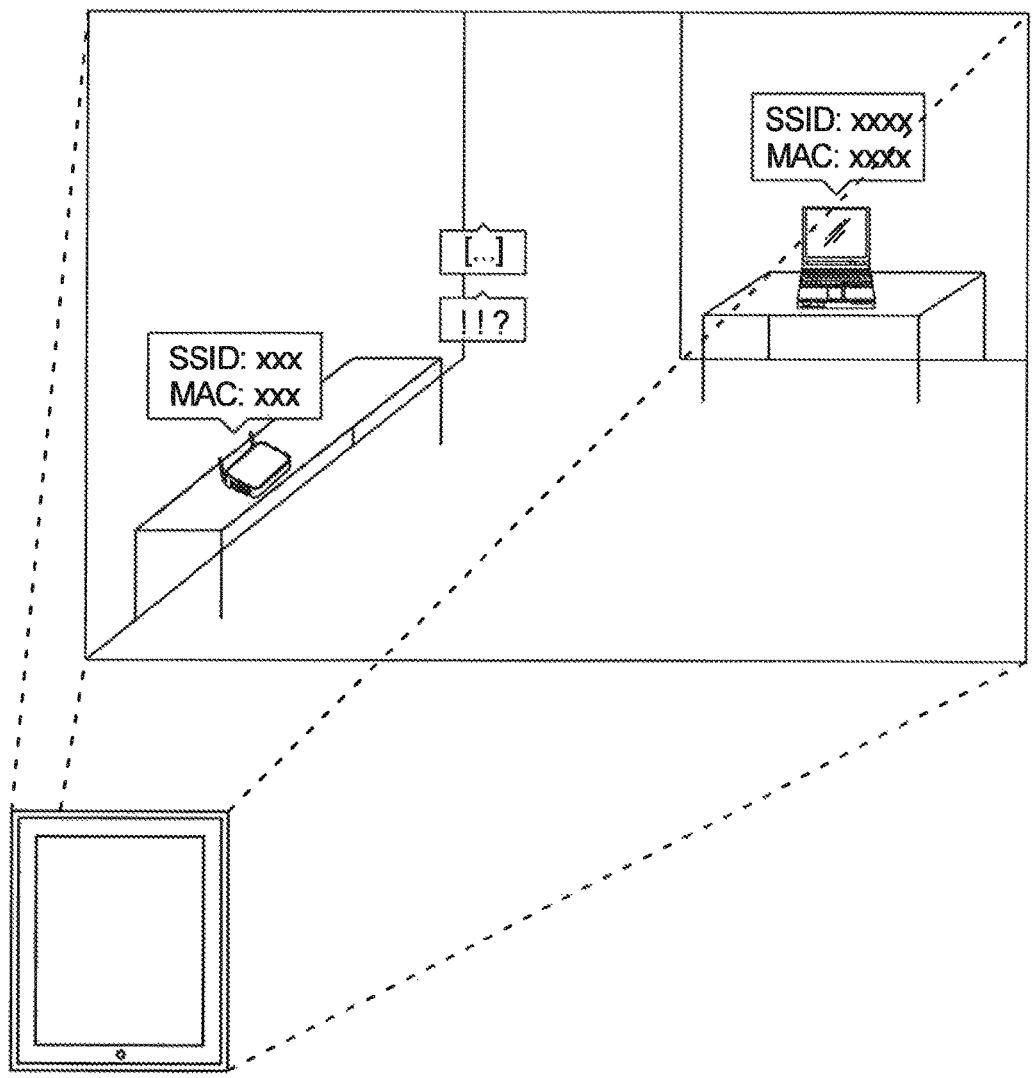
FIGS. 4A-4C illustrate exemplary views displayed by the identification device shown in FIG. 2, showing a location of additional network devices.
Figure 4B:
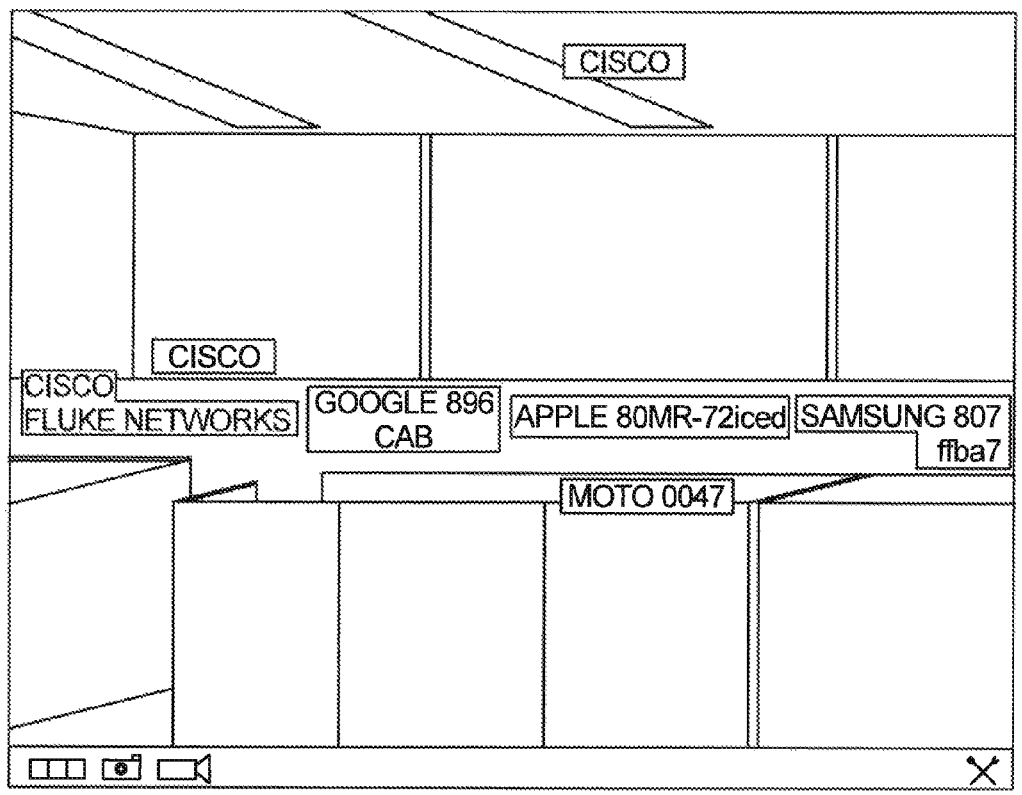
Figure 4C:
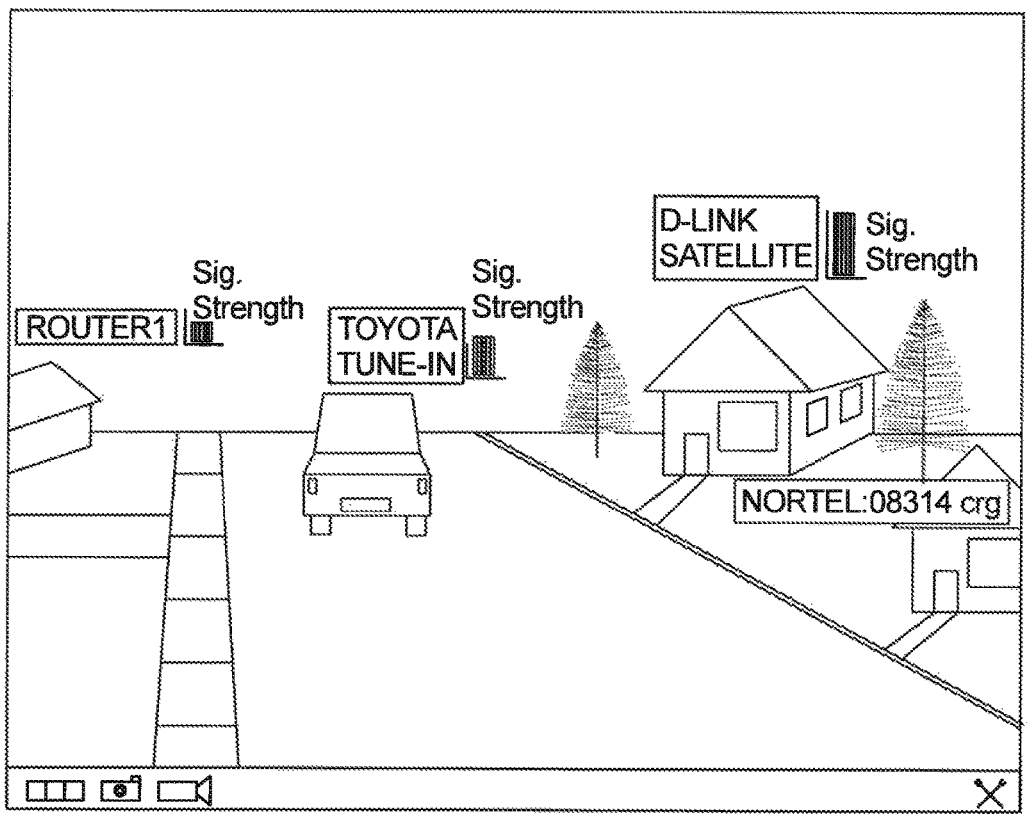

Particularly, FIG. 4A-4C provide exemplary views displayed by the identification device 200 and show an underlying environment enhanced or augmented with data including locations and data regarding each detected wireless network device.

FIG. 4A specifically shows data corresponding to each detected wireless network device including SSID data and MAC address data. Such data is shown as a tag (e.g., a dialogue box) and includes SSID data, MAC address data, as well as indications of additional sources (e.g., "[ . . . ]") and potential noise sources (e.g., "!!?"). As shown, the device in FIG. 4A can include a transparent liquid crystal display (LCD) whereby the data for each detected network device is displayed or overlaid on the LCD surface to reflect a relative distance to the network identification device 200 or a perspective view whereby closer network devices have correspondingly larger tags and further network devices have correspondingly smaller tags. Further, in certain other embodiments, the perspective view to display relative distances of network devices can include color coding, shading (whereby farther away network devices are shaded or faded in appearance), etc. In this fashion, network identification device 200 displays relative distance to detected network devices. With respect to the additional sources and potential noise sources arrows or pointers indicate that the corresponding additional network device and/or noisy device are in locations not shown relative to the underlying physical environment.

FIG. 4B-4C particularly shows various network devices that include computers, tablets, printers, routers, satellite devices, cars including network connections, and the like, each with a corresponding tag. FIG. 4C further includes an indication of relative signal strength for a corresponding network device—shown as a bar graph with a larger bar associated with a greater signal strength.

Notably, in some embodiments, display 270 of network identification device 200 is an interactive touch screen, which allows a user to select the tags. Further, in such embodiments, the tags can include an indication that additional network status conditions are available for a respective network device (e.g., via a "[ . . . ]", etc.). A user can select the tag and request additional network status conditions for the network device (e.g., signal strength, bandwidth, etc.). In response, network identification device 200 displays the additional network conditions.

Figure 5A:
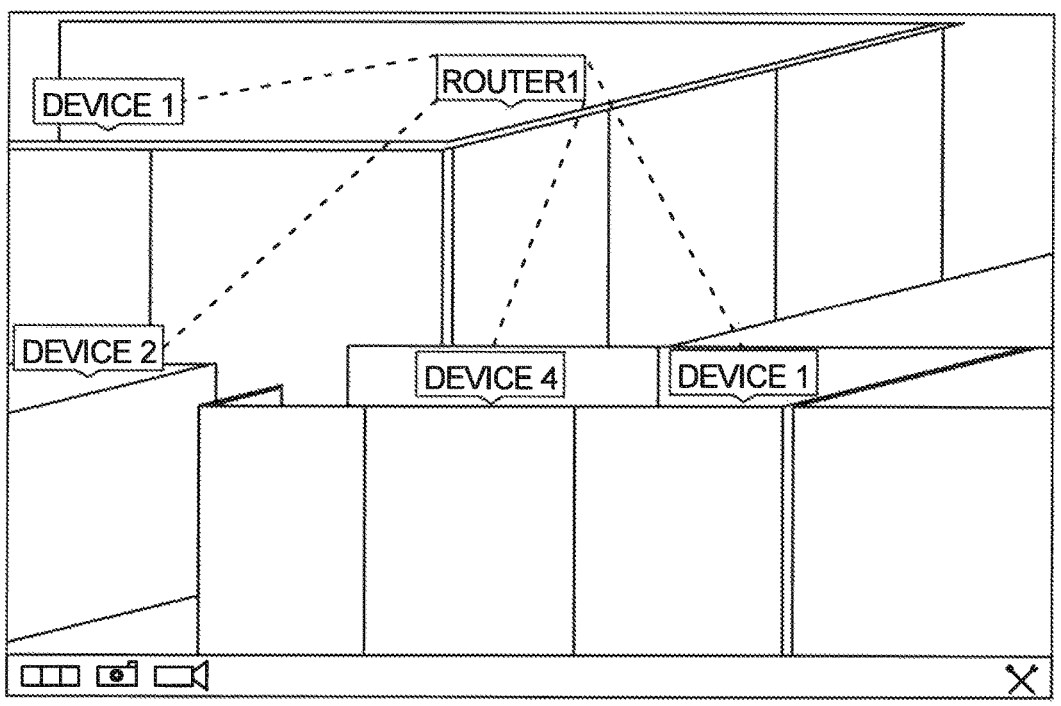
FIGS. 5A-5B illustrate exemplary views displayed by the identification device shown in FIG. 2, showing a specific access device and corresponding client devices connected thereto.
Figure 5B:
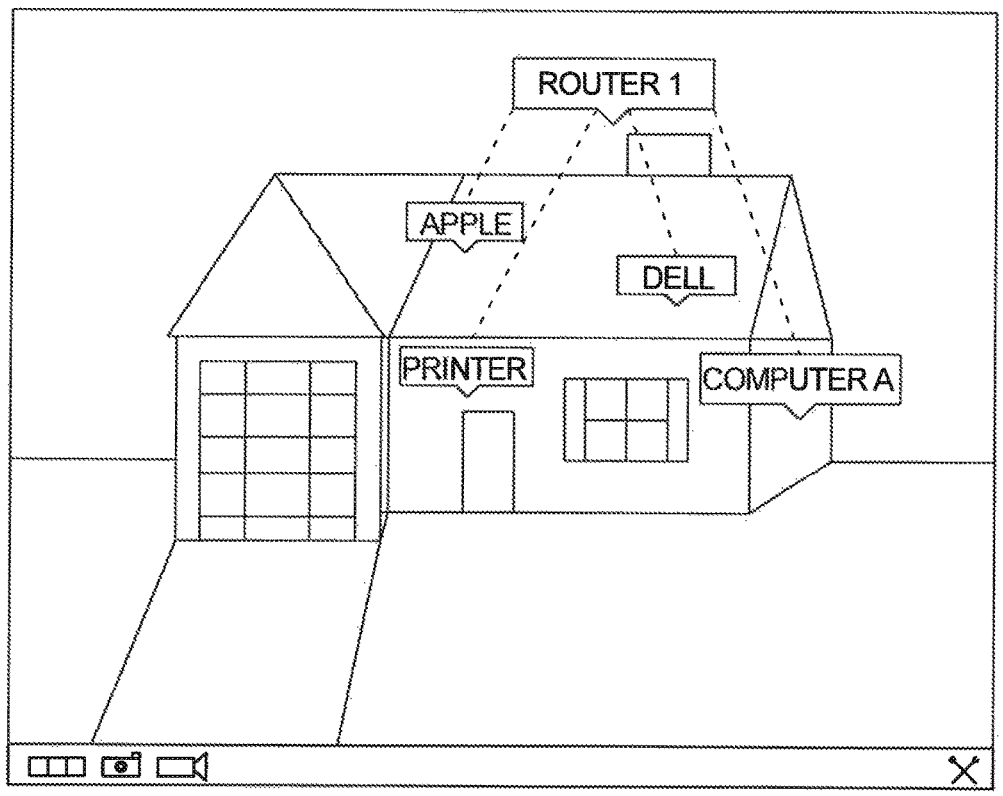

FIGS. 5A-5B are exemplary views shown by identification device 200, indicating a specific access point device (e.g., a router) and corresponding client devices connected thereto. As shown, FIGS. 5A-5B provide a router ("Router1") and corresponding client devices. Illustratively, the association between an access point and a client device is shown with dashed lines, however, in some embodiments, the association can be shown in numerous other ways. For example, the association between networked devices can be shown via color coding similar tags and the like. Further, in certain embodiments, color coding can also indicate other information about certain network devices (e.g., devices that are associated with an owner can be similarly colored, other non-associated devices can be shown in black, new devices can be shown in red, etc.).

Importantly, FIGS. 5A-5B also demonstrate filtering techniques to show only a specific access point and its corresponding network devices. Such filtering techniques, in further embodiments, includes filtering based upon specific types of devices (e.g., access point devices, rogue devices, routers, printers, etc.), SSIDs, MAC addresses, other network addresses, devices, encryption type, specific transmission type (e.g., 802.11b/g/n/ac, etc.), as is appreciated by those skilled in the art.

Figure 6A:
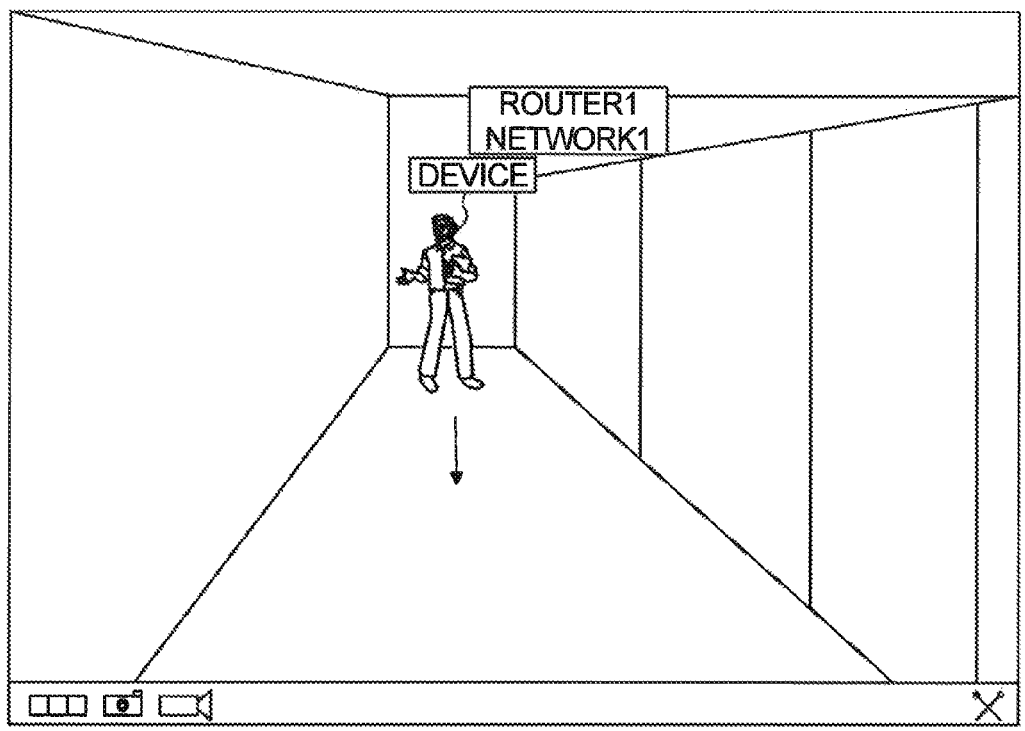
FIGS. 6A-6B illustrate exemplary views displayed by the identification device shown in FIG. 2, showing a mobile device connected to a corresponding access point.
Figure 6B:
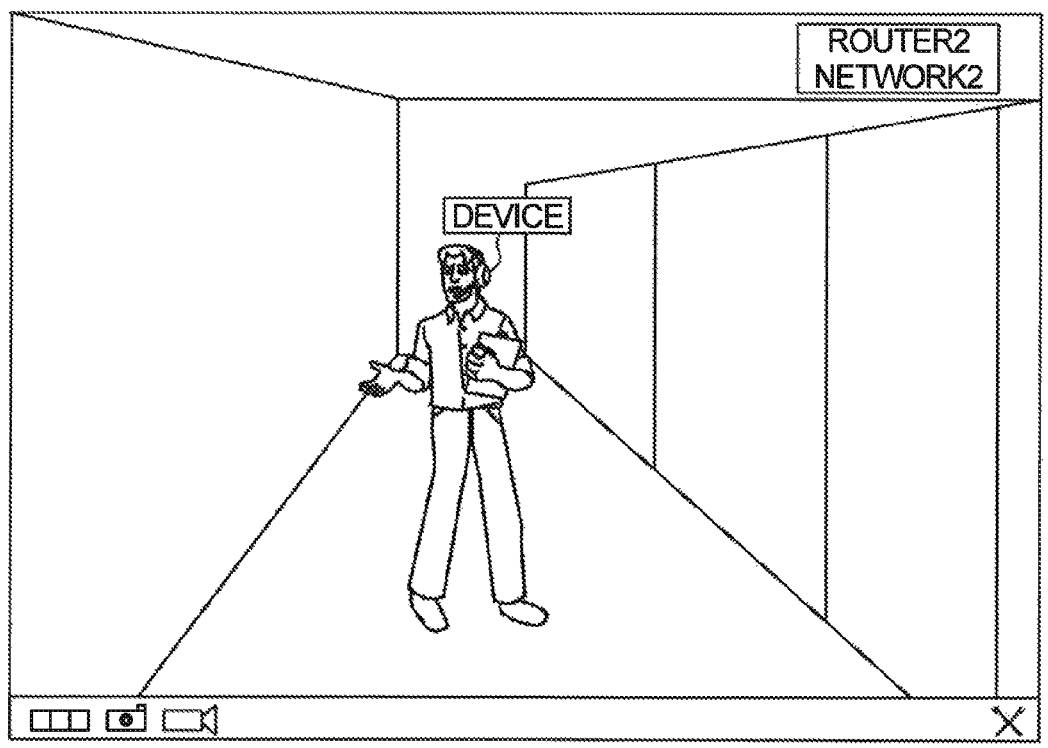

FIGS. 6A-6B collectively illustrate viewing a network device such as a mobile device when it switches between one access point to another, based on location. That is, referring to FIG. 6A, a mobile device ("device") is connected to "Router1" on "Network1". When the user moves to a new location, the mobile device switches connection to "Router2" on "Network2".

Figure 7:
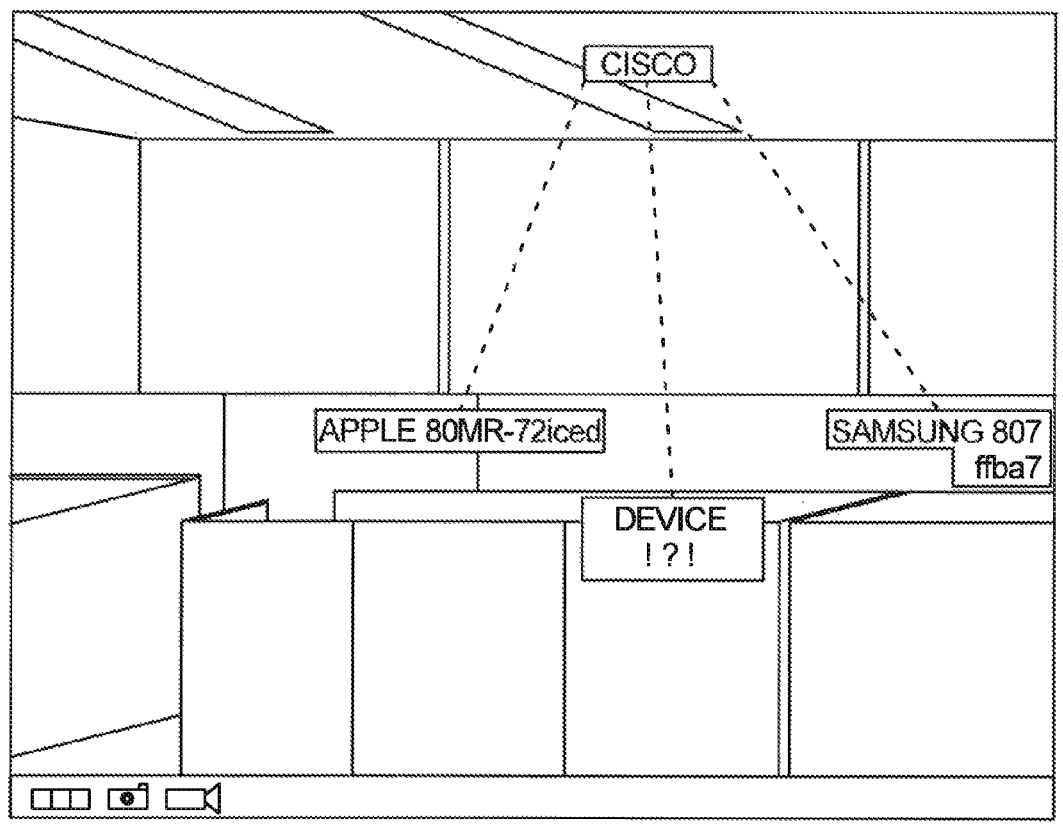
FIG. 7 illustrates an exemplary view displayed by the identification device shown in FIG. 2, indicating a rogue network device connected to an access point.

FIG. 7 illustrates an exemplary view displayed by the identification device 200, indicating a rogue network device connected to an access point. Generally, as described herein, a rogue network device is any unexpected or unwanted device coupled to a particular communication network. As discussed above, network identification device 200 can obtain various network status information regarding particular network devices. In addition to the above, the network status information can also include a list of known (e.g., registered, confirmed, etc.) network devices connected to an access point device. Network devices that are unknown with respect to the access point are referred to as rogue devices can be identified with a corresponding rogue device tag—shown as "Device1 !?!". The rogue device tag can indicate rogue devices via specific text (e.g., "!?!", "rogue", etc.), and in some embodiments, the rogue device tag can be color coded (e.g., a red colored tag indicating a rogue device).

Figure 8A:
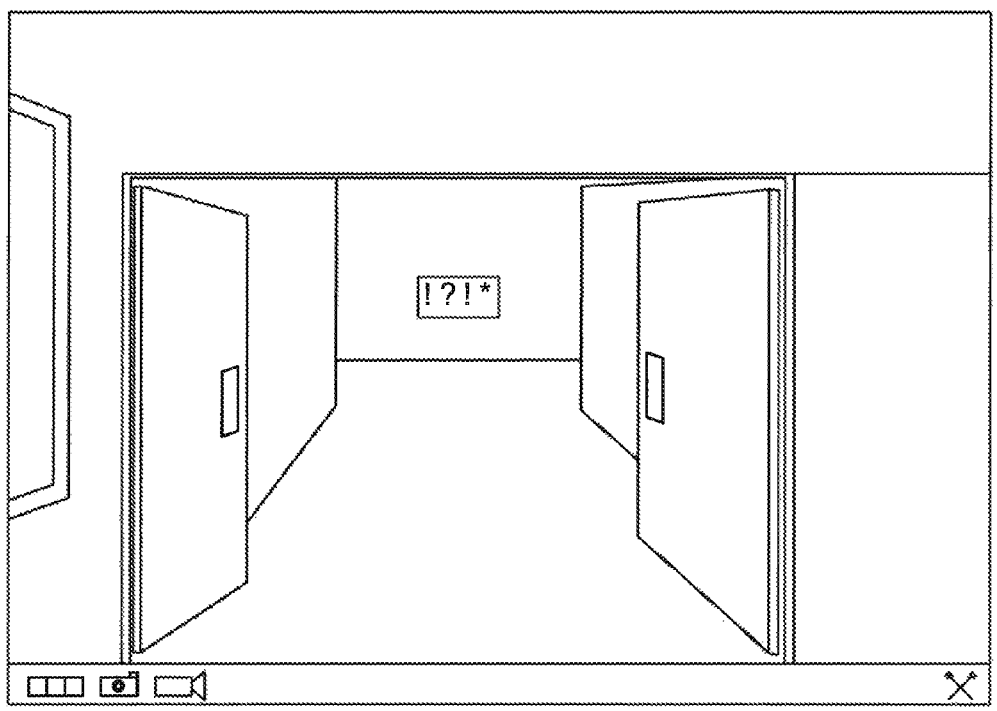
FIGS. 8A-8B illustrate exemplary views displayed by the identification device shown in FIG. 2, indicating noisy wireless sources.
Figure 8B:
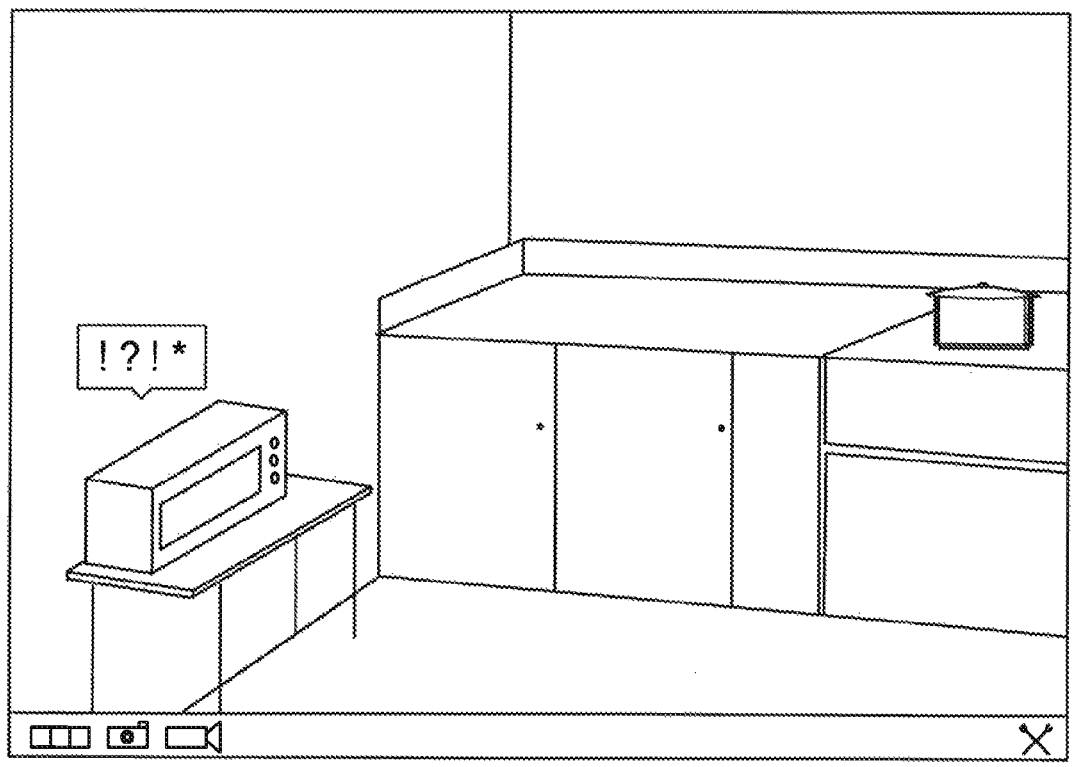

FIGS. 8A-8B illustrate device tags used to indicate noisy wireless sources. Particularly, FIG. 8A indicates a noisy source with a tag labeled—"!?!*". The tag is further associated with an indication of a relative location of corresponding noisy source via arrows. FIG. 8B shows the noisy source with the corresponding noisy tag.

The techniques described herein, therefore, provide for identification of network devices via augmented or enhanced reality display devices. In particular, the techniques herein provide identification information as well as additional network status information for respective network devices. Moreover, using these techniques a user can quickly identify network problem for network devices, identify rogue devices, as well as optimize network device location (e.g., based on indicated signal strength).

While there have been shown and described illustrative embodiments that provide for improved visualization of network devices for particular types of communication networks and using a single identification device, it is to be understood that various other adaptations and modifications may be made within the spirit and scope of the embodiments herein. For example, the embodiments have been shown and described herein with relation to wireless networks such as Wifi networks. However, the embodiments in their broader sense are not as limited, and may, in fact, be used with other types of networks and/or protocols. In addition, while certain embodiments are discussed above with respect to one identification device that includes a resident camera and display, multiple network devices may be used to accomplish the same techniques.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed:

1. A method, comprising:
   receiving, via an identification device, real-time display data, wherein the real-time display data comprises a real image of an environment substantially surrounding the identification device;
   determining, via the identification device, a location of a wireless device connected to a communication network;
   displaying, via a display of the identification device, an augmented reality image by overlaying an indication of the location of the wireless device relative to the real-time display data over the real image;
   determining, via the identification device, whether the wireless device is a rogue device;

displaying, via the display of the identification device, an indication the wireless device is the rogue device, in response to determining that the wireless device is the rogue device;

identifying, via the identification device, a source of wireless noise signals in the communication network;

determining, via the identification device, a location of the source of wireless noise signals within the environment substantially surrounding the identification device; and modifying, via the display of the identification device, the augmented reality image by overlaying an indication of the location of the source of wireless noise signals relative to the real-time display data over the real image.

2. The method of claim 1, further comprising:
determining one or more network status conditions of the wireless device; and
wherein displaying the augmented reality image comprises displaying at least a portion of the one or more network status conditions of the wireless device.

3. The method of claim 2, wherein the wireless device is a Wifi device, wherein the network status conditions comprises at least one of a Media Access Control (MAC) address, an Internet Protocol (IP) address, a name of the Wifi device, a current bandwidth usage of the Wifi device, and a signal strength of the Wifi device.

4. The method of claim 2, further comprising:
indicating, via the identification device, additional network status conditions are available for the wireless device;
receiving, via the identification device, a request for the additional network status conditions for the wireless device; and
displaying, in response to the request, the additional network status conditions for the wireless device.

5. The method of claim 1, wherein determining the location of a wireless device comprises determining a distance of the wireless device relative to the identification device based on a signal strength of the wireless device received by the identification device.

6. The method of claim 1, further comprising:
receiving a plurality of data packets from the wireless device, each data packet being associated with a corresponding signal strength;
wherein determining the location of a wireless device comprises determining a distance of the wireless device relative to the identification device by triangulation of each data packet based on the corresponding signal strength.

7. The method of claim 1, wherein displaying, via the display of the identification device, the augmented reality image further comprises:
displaying the indication of the location of the wireless device relative to the identification device with a closer relative location corresponding to a larger indication and a further relative location corresponding to a smaller indication.

8. The method of claim 1, wherein displaying the augmented reality image further comprises:
displaying the real-time display data according to a color scheme.

9. An apparatus, comprising:
one or more network interfaces adapted to communicate in a communication network;
a display;
imaging circuitry;
a processor adapted to execute one or more processes; and
a memory configured to store a process executable by the processor, the process when executed operable to:
receive, via the imaging circuitry, real-time display data, wherein the real-time display data comprises a real image of an environment substantially surrounding the identification device;
determine a location of a wireless device;
display, via the display, an augmented reality image by overlaying an indication of the location of the wireless device relative to the real-time display data over the real image;
determine whether the wireless device is a rogue device;
display an indication the wireless device is the rogue device, in response to determining that the wireless device is the rogue device;
identify a source of wireless noise signals in the communication network;
determine a location of the source of wireless noise signals; and
modify, via the display, the augmented reality image by overlaying an indication of the location of the source of wireless noise signals relative to the real-time display data over the real image.

10. The apparatus of claim 9, wherein the process when executed is further operable to:
determine one or more network status conditions of the wireless device; and
display the augmented reality image further comprises displaying at least a portion of the one or more network status conditions of the wireless device.

11. The apparatus of claim 10, wherein the wireless device is a Wifi device, wherein the network status conditions comprises at least one of a Media Access Control (MAC) address, an Internet Protocol (IP) address, a name of the Wifi device, a current bandwidth usage of the Wifi device, and a signal strength of the Wifi device.

12. The apparatus of claim 10, wherein the process when executed is further operable to:
indicate additional network status conditions are available for the wireless device;
receive a request for the additional network status conditions for the wireless device; and
display the additional network status conditions for the wireless device.

13. The apparatus of claim 9, wherein determining the location of a wireless device comprises determining a distance of the wireless device relative to the identification device based on a signal strength of the wireless device received by the identification device.

14. The apparatus of claim 9, wherein the process when executed is further operable to:
receive a plurality of data packets from the wireless device, each data packet being associated with a corresponding signal strength and wherein determining the location of a wireless device comprises determining a distance of the wireless device relative to the identification device by triangulation of each data packet based on the corresponding signal strength.

15. The apparatus of claim 9, wherein displaying the augmented reality image comprises displaying the indication of the location of the wireless device relative to the identification device with a closer relative location corresponding to a larger indication and a further relative location corresponding to a smaller indication.

16. The apparatus of claim 9, wherein displaying the augmented reality image further comprises displaying the real-time display data according to a color scheme.

17. A tangible, non-transitory, computer-readable media having software encoded thereon, the software, when executed by a processor, operable to:
- receive real-time display data from an image sensor of an identification device, wherein the real-time display data comprises a real image of an environment substantially surrounding the identification device;
- determine a location of a Wifi device;
- display the real-time display data and an indication of the location of the Wifi device an augmented reality image by overlaying an indication of the location of the Wifi device relative to the real-time display data over the real image;
- determine whether the Wifi device is a rogue device;
- display an indication the Wifi device is the rogue device, in response to determining that the Wifi device is the rogue device;
- identify a source of Wifi noise signals;
- determine a location of the source of Wifi noise signals; and
- modify the augmented reality image by overlaying an indication of the location of the source of Wifi noise signals relative to the real-time display data over the real image.

18. The tangible, non-transitory, computer-readable media of claim 17, wherein the software is further configured to cause the processor to determine one or more network status conditions of the Wifi device and wherein displaying the augmented reality image further comprises displaying at least a portion of the one or more network status conditions of the Wifi device.

* * * * *